(No Model.)
E. GANNAWAY.
AUTOMATIC ELECTRICAL CUT-OFF.
No. 313,313. Patented Mar. 3, 1885.
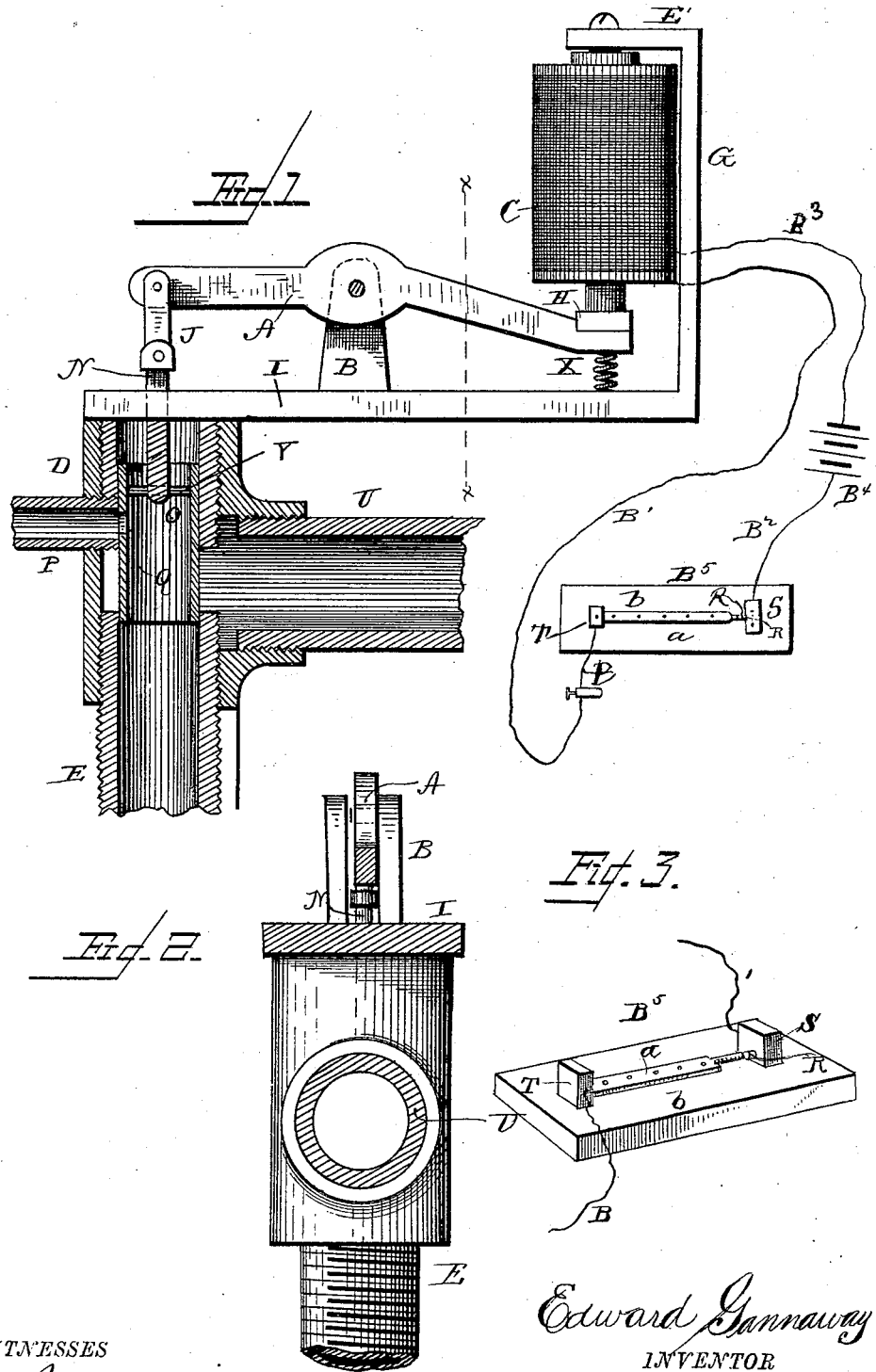
WITNESSES
Theo. Mungen.
E. G. Siggers.
Edward Gannaway
INVENTOR
by C. A. Snow & Co.
Attorneys

UNITED STATES PATENT OFFICE.

EDWARD GANNAWAY, OF NASHVILLE, TENNESSEE.

AUTOMATIC ELECTRICAL CUT-OFF.

SPECIFICATION forming part of Letters Patent No. 313,313, dated March 3, 1885.

Application filed February 16, 1884. (No model.)

*To all whom it may concern:*

Be it known that I, EDWARD GANNAWAY, a citizen of the United States, residing at Nashville, in the county of Davidson and State of Tennessee, have invented a new and useful Automatic Electrical Cut-Off, of which the following is a specification, reference being had to the accompanying drawings.

Figure 1 is a vertical longitudinal sectional view of an electric automatic water cut-off of my invention, the battery and thermal gage being shown in circuit. Fig. 2 is a transverse vertical sectional view. Fig. 3 is a view in perspective of the thermal gage enlarged.

This invention has relation to automatic water cut-offs which are designed for cutting off the water from the house at a point in the ground below the freezing-point by mechanism operated by an electric battery, which is automatically controlled by a thermal gage; and it consists in the construction and novel arrangement of parts, as will be hereinafter fully described, and particularly pointed out in the claim appended.

Referring by letter to the accompanying drawings, E designates the underground water-pipe, the end of which screws into an ordinary T-joint, D.

I designates a metal plate having two posts, B, which form the bearings for the arbor-journals of the lever A, which is connected at one end by a spring, X, to the plate I. The magnets C, only one of which is shown, are suspended from a canopy or top plate, E', extending from the arm G.

H designates the armature secured to the lever A below the magnets. The other end of the lever A is provided with a pivoted arm, J, to the lower end of which is pivoted the piston-rod N, which carries at its lower end the polished cylindrical valve O, open at both ends, and provided with an opening, Q, which is adapted at times to be aligned with the waste-pipe P. All of the pipes E, U, and P have threaded ends, and are connected to the T-joint D, as shown. The valve O is connected to the piston-rod J by a cross-pin, V. In Fig. 1 the valve V is shown closed—that is, the hydrant-pipe U is cut off.

The wires B B' B² B³ connect the magnets C and C' with the battery B⁴, and also with the thermal gage B⁵, as shown.

The thermal gage consists of a strip of brass, *a*, slightly bent and securely riveted to a piece of rubber or gutta-percha, *b*. The strip *a* is secured to a post, T, and extended horizontally, with the other end opposite a set-screw, R, in the post S. The wire B', leading from the magnet C, is connected to the switch and extends to the post T, to which it is connected. The battery is connected by the wire B² to a magnet in rear of the magnet C, (but not shown in the drawings,) and to the post S by the wire B³. The screw is properly set, and when the temperature of 32° is reached the metal strip *a* will touch the screw R and close the circuit, by reason of the fact that the metal contracts under cold and expands under heat. When the circuit is closed in this manner, the electro-magnets will attract the armature H and close the valve O, and cause it to be aligned with the waste-pipe P, to permit the escape of the waste water. The switch P is connected to the water-cock, (not shown,) so that when the water-pipes are empty and water is needed for use, by simply turning the water-cock, the electric circuit will be broken and the valve O opened until a sufficient quantity of water has been drawn, when the circuit may be again closed and the water cut off, and the pipes emptied through the waste-pipe.

In this manner the pipes may be prevented from freezing and bursting. It saves the waste of water now incurred by letting the water flow to prevent freezing. It also saves the unnecessary consumption of fuel required to keep the building warm to prevent the pipes from freezing, and, besides, it requires no other attention than to occasionally replenish the battery, which is of little consequence or expense.

It is also evident that the valve O may be made longer, and hence extend farther into the end of the nipple of the house-pipe, thus forming a guide, in which case the valve may be perforated with numerous small holes circling it at a point which will pass into the nipple of the house-pipe when the valve is lowered, and on the other hand be aligned with the hydrant-pipe when the valve is raised; but if the apparatus be artistically made, the nipple surrounding the upper end of the valve will be found to be a sufficient guide.

Having thus fully described my invention, what I claim as new, and desire to secure by Letters Patent of the United States, is—

In an automatic water cut-off, the combination, with a hydrant-pipe, a service-pipe, and a waste-pipe connected by a T-joint, the pivoted lever supporting the valve and the armature, of the perforated valve within the T-joint, the electric battery, and the thermal gage connected in circuit therewith, substantially as specified.

In testimony that I claim the foregoing as my own I have hereto affixed my signature in presence of two witnesses.

EDWARD GANNAWAY.

Witnesses:
U. E. AMOSS,
J. W. RUDOLPH.